United States Patent [19]

Gerhards

[11] 3,884,607

[45] May 20, 1975

[54] PLASTICIZING EXTRUSION DEVICE EMPLOYING WORMS

[75] Inventor: Bernhard Gerhards, Mausbach Uber Stolberg, Rhineland, Germany

[73] Assignee: Kleinewefers Industrie-Companie GmbH, Krefeld, Germany

[22] Filed: Jan. 15, 1974

[21] Appl. No.: 433,531

[30] Foreign Application Priority Data
Jan. 16, 1973  Austria .................................. 342/73

[52] U.S. Cl. ................ 425/144; 259/191; 425/204; 425/208; 425/379
[51] Int. Cl. .............................................. B29c 3/06
[58] Field of Search ..... 259/191, DIG. 18; 425/207, 425/208, 209, 378, 379, 190, 191, 192, 143, 144, 376, 203, 204; 264/349

[56] References Cited
UNITED STATES PATENTS
3,060,512  10/1962  Martin et al. .................... 425/208 X

| | | |
|---|---|---|
| 3,391,051 | 7/1968 | Ehrenfreund et al. ........... 425/378 X |
| 3,525,124 | 8/1970 | Ocker ............................. 425/379 X |
| 3,762,692 | 10/1973 | Schippers ................ 259/DIG. 18 X |
| 3,822,867 | 7/1974 | Evans............................... 425/144 X |
| 3,826,477 | 7/1974 | Kunogi et al. ................... 425/208 X |

FOREIGN PATENTS OR APPLICATIONS
1,190,406  1959  France ............................... 425/191

Primary Examiner—R. Spencer Annear
Assistant Examiner—Mark Rosenbaum
Attorney, Agent, or Firm—Walter Becker

[57] ABSTRACT

A plasticizing extruder having a pair of counterrotating worms in a housing with the helical ribs thereof interengaged in which respective axial zones of the worms are individually heated to respective temperatures and with the height of the rib means on each worm being decreased in at least one selected axial region of the respective worm.

11 Claims, 6 Drawing Figures

PATENTED MAY 20 1975

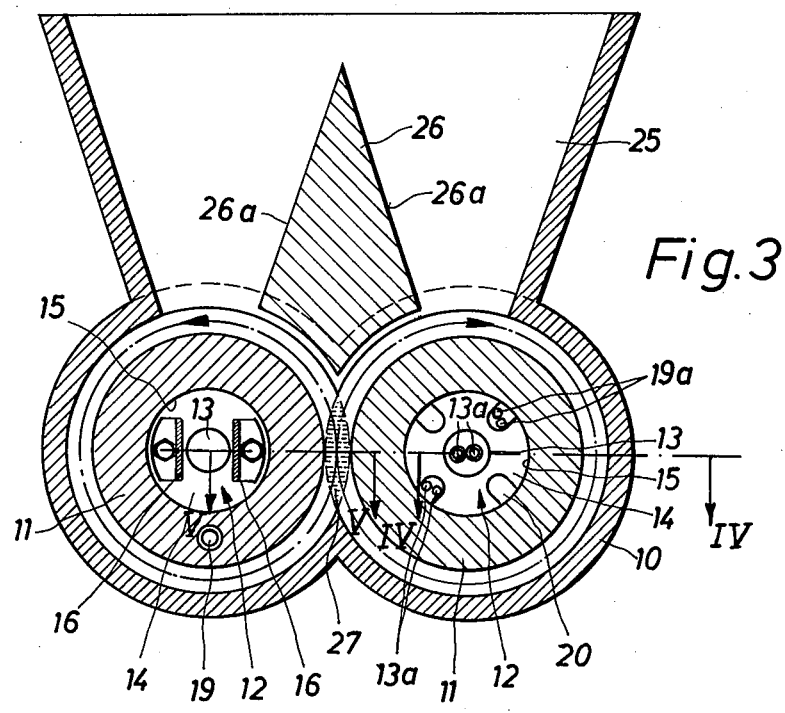
Fig. 3
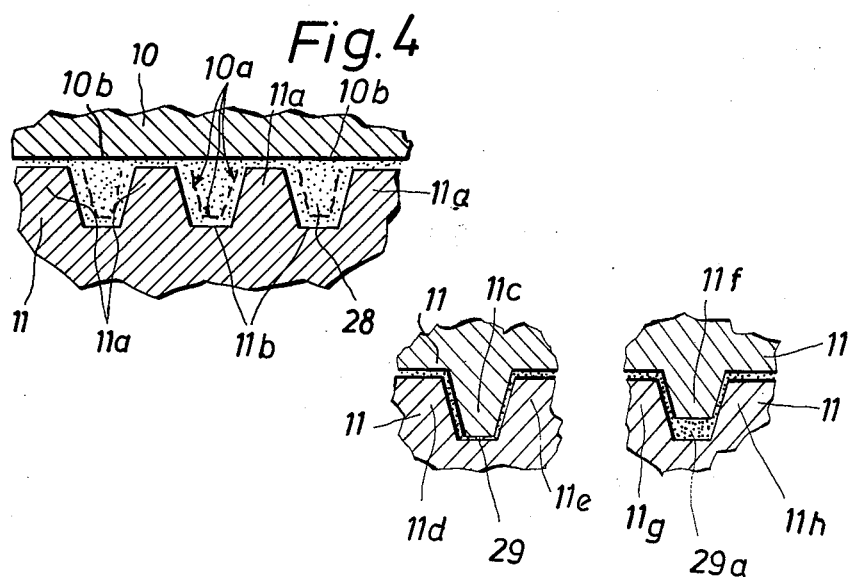
Fig. 4
FIG. 5    FIG. 5A

PLASTICIZING EXTRUSION DEVICE EMPLOYING WORMS

The present invention relates to a two and more worm extruder for the plastification and mixing of synthetic materials, which has at least two worms in overhung arrangement and which are driven in opposite direction with regard to each other while each of said worms, the threads of which mesh with each other, is equipped with inner heating means.

Worm extruders the only worm of which is rotatable and is in an overhung manner longitudinally displaceably mounted while heating means for heating the mantle extend at least over a portion of the length of the housing are as well known as the double worm extruders with longitudinally displaceable worms rotating in the same direction while their thread windings mesh with each other. With these double worm extruders, the heating of the mantle to be plasticized can be effected from the outside through the intervention of the housing. Such a construction, however, is disadvantageous inasmuch as considerable heat losses occur and on the other hand the material to be conveyed is frequently insufficiently heated over the entire conveying range. Furthermore, an inner cooling of the two worms may be effected by a heat exchanging substance for instance cooling water, which circulates in the longitudinal direction of each worm.

There has furthermore become known an extruder for synthetic materials the worm of which is displaceable in a housing adapted to be heated from the outside, which worm is by means of a displacing device movable toward the front which means toward the front end of the extruder in order to eject the mixed and plasticized mass of synthetic material from the extruder. The worm of this extruder is provided with a partially or completely auxiliary heating for the interior of the extruder. Thus, with this last mentioned extruder, the plasticizing mixing is effected by the worm in a cycle which is independent from the feeding within the extruder housing and from the ejection of the processed synthetic mass from the housing so that a final operation is obtained in the sequent "mixing and plasticizing on one hand and a conveying" on the other hand, the working cycles being separate working cycles. The operation of this extruder corresponds to the working of an extrusion press, with regard to the conveying of the mass of synthetic material.

There has also become known a device which serves for producing press mixtures of hardenable masses of synthetic material in which device two worms are employed which are both driven in clockwise direction and which mesh with their threads and with each other. A heating or cooling substance may be conveyed primarily over the front longitudinal section which is adjacent to the ejector end. In this construction, the worm turns or worm windings are provided on threaded sleeves which are exchangeable for threaded sleeves with greater or smaller pitch. For purposes of mixing hardenable synthetic materials, in other words non-plastic synthetic materials, this last mentioned device can be employed very usefully. However, the device is not suitable for plasticizing thermoplasts unless conical worms are employed in a corresponding housing provided with conical receiving bores. In extruders of this type with rotation of the worms in a direction opposite to each other, the worms may be heated inwardly by means of a heating fluid such as oil which is passed through longitudinal bores in the worms. In order to realize the conveying of the material to be plasticized and an ejection of the processed mass of synthetic material, it is necessary in addition to giving the worms a conical contour, to subdivide the worms along their length in which instance the two longitudinal sections of each worm have different speed of rotation.

This last mentioned type of extruders with interior heating to which group also incidentally the extruder of the present invention belongs, is relatively expensive in view of the conical worms, the conical bores in the housing, the subdivision of worms, and the different drive of the worm sections so that the degree of efficiency in other words the output is relatively low or they meet only part of the problem, namely the mixing and the pressing.

It is, therefore, an object of the present invention to provide a two or multi-worm extruder of the general type mentioned above, which will be simple in construction and inexpensive to make and which furthermore in a continuous manner will mix, plasticize, and simultaneously convey and eject the mix of synthetic material while with a given supplied heat energy a highly satisfactory homogenization will be assured and with a given length of the extruder a high throughput per time unit and a careful processing of the synthetic material as well as the journalling of the worms will be realized.

These and other objects and advantages of the invention will appear more clearly from the following specification in connection with the accompanying drawings, in which:

FIG. 3 is a vertical cross section through the double worm extruder at the intake zone.

FIG. 4 illustrates a cross section through a partial range of the worm and of the cylinder with the worm spirals or turns forming the heat emanating surfaces and with material to be conveyed therebetween, this cross section being taken along the line IV—IV of FIG. 3.

FIG. 5 is a section taken along the line V—V of FIG. 3. FIG. 5a is a section similar to FIG. 5 through a worm thread section having a lower height than the corresponding worm thread section in FIG. 5.

Figure 1:
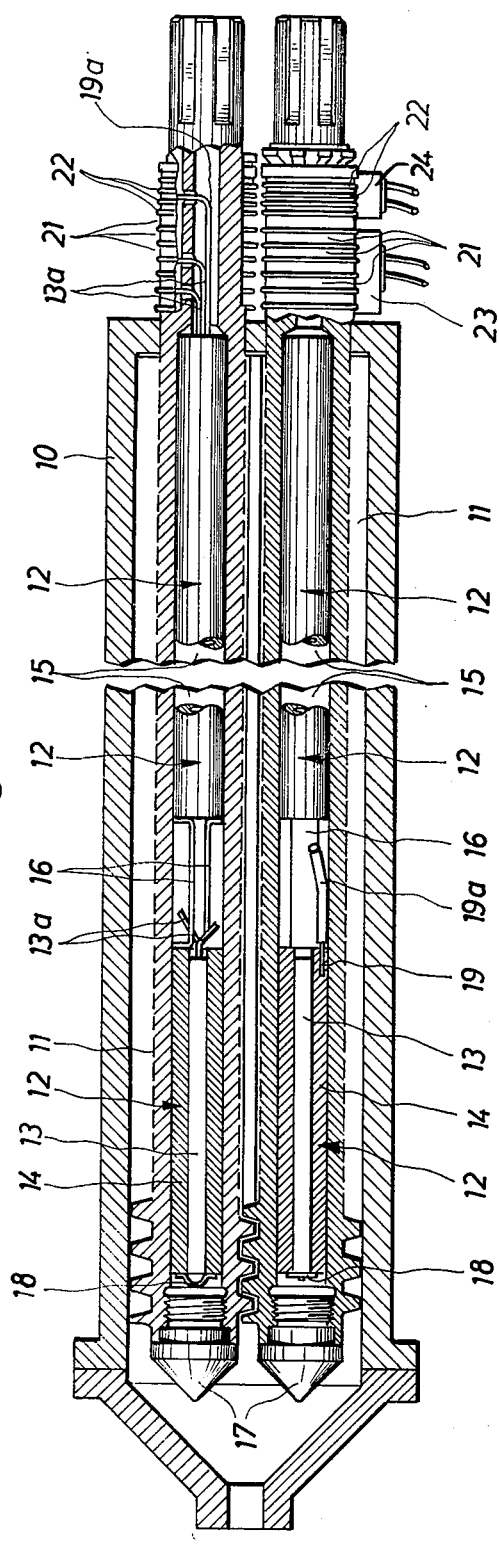
FIG. 1 is a horizontal longitudinal section through an extruder according to the invention with heating means arranged within the worms meshing with each other.

The extruder according to the present invention is characterized primarily in that the interior heating means which extend over the length or a portion of the length of the cylindrical worms which are parallel to each other is subdivided into heating zones of a different heating temperature of the synthetic material while at least in one zone the worm spirals are adapted to be heated to the plasticizing temperature of the synthetic material and while each worm is in at least one zone provided with worm spirals which are partially reduced as to height and form increased receiving chambers.

Preferably, the heating device is an electrical heating device which is variable as to temperature. The heating device of one zone may be variable as to temperature independently of the heating device of the other longitudinal zones of a worm.

According to a further development of the invention, the height of the worm spirals may within some of the zones increase or decrease gradually toward the extruder exit. The heating device may be arranged in a bearing bushing of a material with higher heat expansion coefficient than that of the material from which the worms are made.

The primary feature underlying the present invention consists in that for feeding and ejecting as well as for mixing and plasticizing a thermoplastic synthetic mass, it is not necessary to employ an expensive subdivided pair of worms rotated in opposite direction with regard to each other. Rather, the advantage of heating over a large surface and the plasticizing of the synthetic material in the so-called wedge range of the worms meshing with each other is obtainable with a simple construction of the extruder if a different preferably variable temperature is conveyed to the individual longitudinal zones in cooperation with a different pitch of the worms while at least in one of the zones, the worm spirals are held at plasticizing temperature.

Referring now to the drawings in detail, the double worm extruder according to the invention for processing thermoplastic synthetic materials such as polyvinylchloride (PVC) or the like has a housing 1 in which are rotatably journalled two motor driven worms 11 meshing with each other and adapted preferably to rotate in opposite direction with regard to each other (FIG. 3). These worms have that end thereof which is adjacent to the drawing-in zone arranged in an overhung manner.

In each worm 11 there is arranged at least one heating device 12, preferably an electric heating device which is adjustable and is adapted to heat the synthetic material to be plasticized and to be mixed. For purposes of obtaining different temperatures or different variable heating zones in each worm 11, there is provided a plurality of heating devices 12 which in the longitudinal direction of the worms are arranged in spaced relationship to each other one behind the other. These heating zones 12 are adapted to create zones of the same and/or different temperatures.

Each heating zone 12 is formed by an electric heating cartridge 13 for instance a heating element which is held in a bearing bushing 14 of material which has a higher heat expansion coefficient than that of the material from which the worms are made, preferably the material of the bearing bushing 14 is bronze.

Each worm 11 receives the heating device 12 in a central bore 15 which extends in the longitudinal direction of the worm. Each heating device 12 is together with its bearing bushing 14 loosely inserted into said bore 15. In view of the expansion coefficient of the bearing bushing material, it will be appreciated that during the heating up of the bushing, the bushing widens with the result that the bearing bushing 14 will be clamped in in the bore 15 so that its position will be fixed. However, when the bearing bushing cools off it will permit an easy withdrawal of the heating element 12.

In the longitudinal direction of the worm, a plurality of heating devices 12 which are parallelly arranged one behind the other and spaced from each other by spacer means 16, may be connected to each other to form a structural unit which as an entirety can be withdrawn from the worm 11 after the worm tip 17 at the ejector side has been withdrawn from the worm 11. To this end, the first bearing bushing 14 when viewed in the pull-out direction may be provided at its ejector end first with a handle 18.

For purposes of controlling the desired temperature which is to be realized by the heating device 12 in the respective worm zone pertaining to the respective heating device, each bearing bushing 14 is engaged by a temperature feeler 19.

The length of each heating device 12 corresponds to the length of the respective required heating zone within the worms 11.

The bearing bushings 14 of the heating devices 12 are provided with passages 20 (FIG. 3) for passing through the individual electric conductors 13a, 19a pertaining to the respective heating device 12 and the respective temperature feeler 19.

Each heating device 12 has an electric conductor 13a of its own which is passed in the longitudinal direction of the worm through the worm 11 and is detachably connected to a sliding contact 21 arranged on the worm 11 outside the housing 10. Also each temperature feeler 19 is with its electric conductor 19a passed in the longitudinal direction of the worm and through adjacent heating devices 12 and is detachably connected to sliding contacts 22 which are arranged in spaced relationship to the heating device-sliding contacts 21 and located in the same worm end region. By disconnecting the electrical conductors 13a, 19a from their sliding contacts 21, 22, it is possible to pull out the structural unit of the heating devices together with the heating feelers 19 from the worms 11 toward that end which faces away from the sliding contacts 21, 22.

The sliding contacts 21 for the heating devices 12 have associated therewith a current supply device 23 which together with the contacts 21 forms a collector.

The sliding contacts 22 of the temperature feelers 19 have associated therewith a transmitting device 24 which through the intervention of an electric conductor leads to a control for controlling the current supply to the heating devices 12 in conformity with temperature feeler-pulses. The heating cartridges 13 may also in a manner known per se be arranged in a heat carrier medium, preferably oil.

Each conveyor 11 has, over its entire length, from the material receiving end which has a higher temperature to the material ejector end which has a lower temperature, a drawing-in zone A, a first compressor zone B, a shut-off zone C, a vacuum zone D, a second compressor zone E, and an ejector zone F. All zones are heated with the exception of the drawing-in zone A and the vacuum zone D.

Figure 2:
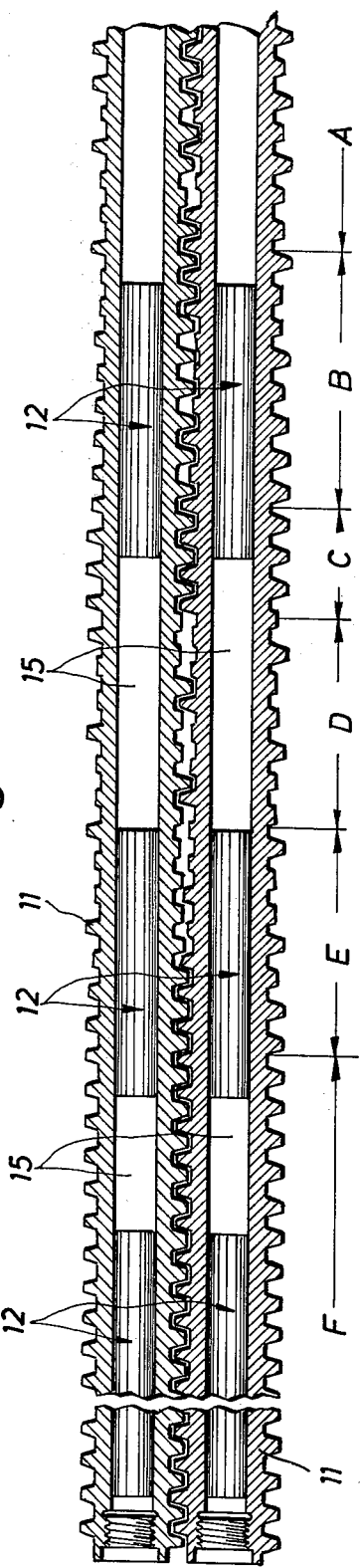
FIG. 2 represents a longitudinal section through the two intermeshing worms with worm windings at full and reduced pitch while the worms in the individual zones are subdivided with or without heating devices.

As will be evident from FIG. 2, the height of the worm turns of each conveyor worm 11 varies within the region of the intake or drawing-in zone A, the first compressor zone B, the vaccum zone D and the second compressor zone E. This means that at least some of the turns of the worms 11 are in these regions somewhat cut back with regard to adjacent turns of the worm while in the zones B and E, the turns of the worms with the lowest height of the thread are adjacent to the material receiving sides, and that the height of those turns increases which follow in the direction toward the ejector side. The shutting-off zone C and the ejector zone F are over the entire length provided with worm turns of the same height.

For purposes of increasing the receiving volume, and in order to obtain a proper mixing effect, the turns of the zones A, B, D and E are reduced each to their height over more that 360°.

In that end region of the worms 11 which is located at the driving side, there is provided a funnel 25 which feeds the synthetic material to be plasticized and to be mixed to both worms 11. In the funnel 25 there is provided a guiding member 26 of rhombic cross section which is located above the wedge region 27 indicated by horizontally extending dash lines, said region 27 being formed by the meshing effects of the turns or windings of the worm. The guiding part 26a is at its lower end arched in a double concave manner and has feeding surfaces 26a. In view of these feeding surfaces 26a, a turbulence-free feeding of the material from the funnel 25 to the two conveyor worms and more specifically its intake regions, will be assured.

In the worm end range at the pull-in side, there preferably prevails a higher temperature than in the worm end region at the exit side, for instance, in the zones A, B and C and may prevail a temperature of approximately 220°C whereas in the zones D and E there may prevail approximately a temperature of 200°C and in the zone F there may prevail a temperature of approximately 160°C.

It is a matter of course that with the double worm extrusion press it may also be advantageous to heat or to cool the housing 10 additionally from the outside. The mass of synthetic material is in the longitudinal direction of the worm moved toward the ejector end and during the passage through the extruder, it is plasticized and mixed while the compressor zone B which follows the intake zone A brings about a compression of the mass to be conveyed because here the height of individual turns of the worms is less so that an increased volume is received between the worms whereby an increased mixing effect is realized. The subsequent shut-off zone C represents a blocking region between the compressor zone B and the vacuum zone D so that only the compressed material in the vacuum zone D which is not heatable is freed from its volatile components. The subsequent compressor zone E will in view of the worm turns reduced in height bring about an increase in volume and a mixing effect. In the long ejector zone F, the material is moved to the ejector end when the range temperature has been reached, in which instance the material will in its ejector zone F obtain its processing property.

The worms 11 have the outside of the worm turns with a greater height engage the housing 10 at the necessary play of movement.

The operation of the double worm extruder for plasticizing material is as follows: as material 28 to be plasticized there may be mentioned primarily synthetic substances which are filled into the extruder funnel 25 in the form of a granulate, a glomerate, or finest grain powder with mixed-in or mixed-on additions of stabilizers, softeners and dye pigments.

The material 28 is by the worms 11 pulled into the funnel 25 and is conveyed to the exit end of the worms 11.

On its way, heat in the form of direct heat energy and frictional heat is conveyed to the material 29. The frictional heat is caused by friction of the material 28 between the worms 11 and the cylinder 10 and primarily due to the shearing of the material in the wedge region 27 of the intermeshing worms 11 (FIG. 3). Within the region 27, it is possible due to the supply of heat energy controlled in conformity with the invention, to influence by the worms the shearing of the material as it occurs. Inasmuch as the synthetic materials are as a rule poor heat conductors, the large contact surfaces are of great advantage for the radiation of heat. When pressing through the conveyor path, the individual particles of the material are subjected to a turbulence and to the absorption of heat emanated from the radiating surfaces. In view of the worm geometry, i.e., change in the worm height and worm width, it is possible to create the necessary adaptation of the change in volume of the melting material 28. In view of the change in volume of the thread turns on the worms 11, there is simultaneously obtained compression of the melting material 28 as it is necessary for homogeneous plasticizing. The operation in the individual worm zones according to FIG. 2 as influx onto the material 28 to be plasticized is as follows in the light of the above mentioned description: in zone A, the still cold material 28 is received by the worm 11. In zone B the material is heated by the worms 11 while the gradual compression in this zone B brings about the necessary turbulence. In zone C, the preheated material 28 is heated further, compressed and sintered. In zone D, the sintered material expands and disintegrates again so that volatile components can be sucked off. In the zone E, the material is again subjected to a compression, is further heated while being in turbulence, and is ejected over the zone F. The supply of friction heat should be greater in zone F than the supply of normal heat energy. The heat withdrawal expediently is effected in adaptation to the individual function, i.e., in conformity with the property of the material, the quantity of heat is controlled in the zones B, C, E, and F.

FIG. 4 shows the free intermediate space or gap between successive worm turns 11a of worm 11 on one hand and the bottom 11b and wall 10b of the housing 10 on the other hand, said gap being filled with synthetic material 28; the region which has been heated by the worm height 11a and the bottom 11b is limited toward the inside by the substantially V-shaped line 10a and is approximately three times as large as that of the region which is adjacent to the housing wall 10 and which is heated when heating the housing 10. If also the housing 10 is additionally subjected to a temperature control it is possible within the region of the housing wall 10b to influence the conveyors and the intermixing of the material within the wide limits. FIGS. 5 and 5a illustrate the intermixing worm turn 11c, 11d and 11e of the two worms 11 in the wedge region 27. The illustration of FIG. 5 shows the engagement of the worm turn 11c with full height between the worm turns 11d and 11e, whereas FIG. 5a shows a worm turn 11 of smaller height between the worm turns 11g, 11h.

The worm turns 11c, 11f on one hand and 11f, 11e, 11g and 11b on the other hand may be formed by the same worm turns in individual regions of the various zones A–F. FIG. 5 illustrates that between the turns 11c, 11d, 11e within the wedge region 27, a gap forms in which the material is heated not only by the walls of the turn 11c but also by the walls of the turns 11d, 11e. A maximum heating surface is formed due to the decrease in cross section from the cross section according to FIG. 4 between successive turns of a worm to the gap. According to FIG. 5, an acceleration of the conveying movement occurs so that the strong heating up in the gap will not bring about an overheating of the material as otherwise might occur. Due to the variation of the gap for instance by increasing the same to form a gap 29a as shown in FIG. 5a, it is possible to control the change in the magnitude of the heating surface (walls of turns 11f, 11g, 11h) and thereby the magnitude of the heating gap cross section as well as the conveying speed in the gap.

In the wedge section 27, the synthetic material will obtain a high viscosity. As a result thereof, also the pressure of the synthetic material in said wedge region upon the worms arranged in a overhung manner will be reduced. When less viscous material is located in the wedge region, this material will try to spread the worms away from each other whereby the bearings for the worms would be stressed considerably. This drawback is completely eliminated with the extruder according to the present invention. The term "extruder" for the device according to the present invention may not be fully proper because with this device, in the wedge region there will occur the plasticizing and conveying while the there located mass of synthetic material is being heated. Consequently the new term "worm extruder pump" would be suitable for this new device.

It is, of course, to be understood, that the present invention is, by no means, limited to the specific showing in the drawings but also comprises any modifications within the scope of the appended claims.

What is claimed is:

1. In a plasticizing worm extruder; a housing, a pair of elongated parallel and rotatable worms in said housing having interengaged helical rib means thereon, feed opening means in said housing for supplying material to be plasticized and extruded to said worms near one end thereof and discharge opening means in said housing for the extrusion of the plasticized material from near the other end of said worms, means in said worms for heating axial regions thereof to respective temperatures, at least one of said regions being heated to the plasticizing temperature of said material, each said worm having the radially outer ends of at least a portion of the said rib means thereon disposed close to the housing and each worm having at least one axial zone wherein the said rib means is reduced in at least the height thereof to increase the space to receive said material.

2. A plasticizing worm extruder according to claim 1 in which the reduction in height of said rib means extends over at least about 360° of the respective worm.

3. A plasticizing worm extruder according to claim 1 in which said means for heating said worms comprise electric heating means therein.

4. A plasticizing worm extruder according to claim 3 in which said electric heating means comprise individual electric heaters in said axial regions of each worm, and means for independantly controlling the temperature of said heaters.

5. A plasticizing worm extruder according to claim 1 in which at least part of the rib means which vary in height vary gradually in the circumferential direction of the respective worm.

6. A plasticizing worm extruder according to claim 1 in which said heating means comprise electric heater cartridge means substantially cylindrical in configuration, each worm having a tubular axial cavity for receiving the cartridge means.

7. A plasticizing worm extruder according to claim 6 in which each cavity is larger in diameter than the cartridge means, and bushing means in the cavity surrounding the cartridge means and having a higher coefficient of thermal expansion than the respective worm.

8. A plasticizing worm extruder according to claim 7 in which said bushing means freely receives the cartridge means and is freely receivable in the respective cavity in unheated condition and when heated expands into tight engagement with the periphery of at least the cavity.

9. A plasticizing worm extruder according to claim 1 in which each worm comprises a plurality of axial zones including an intake zone near said one end of the worm, a first compression zone following the intake zone, a shut-off zone following the first compression zone, a vacuum zone following said shut-off zone, a second compression region following the vacuum zone, and an ejector zone following the second compression zone and disposed near said other end of the worm, the height of said rib means being reduced in said intake zone, said compression zones, and in said vacuum zone.

10. A plasticizing worm extruder according to claim 1 in which the rib means which are reduced in height gradually change in height in the circumferential direction of the respective worm with the smallest height at the upstream end in respect of the direction of movement of said material along said worms.

11. A plasticizing worm extruder according to claim 1 in which said worms are counterrotating.

* * * * *